(12) United States Patent
Xiao et al.

(10) Patent No.: US 12,437,771 B2
(45) Date of Patent: Oct. 7, 2025

(54) NEURAL NETWORK-BASED AUDIO PACKET LOSS RESTORATION METHOD AND APPARATUS, AND SYSTEM

(71) Applicant: ZHUHAI JIELI TECHNOLOGY CO., LTD, Zhuhai (CN)

(72) Inventors: Quanzhi Xiao, Zhuhai (CN); Yufeng Yan, Zhuhai (CN); Rongjun Huang, Zhuhai (CN); Guiping Fang, Zhuhai (CN)

(73) Assignee: ZHUHAI JIELI TECHNOLOGY CO., LTD, Zhuhai (CN)

( * ) Notice: Subject to any disclaimer, the term of this patent is extended or adjusted under 35 U.S.C. 154(b) by 548 days.

(21) Appl. No.: 17/911,733

(22) PCT Filed: Sep. 30, 2020

(86) PCT No.: PCT/CN2020/119603
§ 371 (c)(1),
(2) Date: Sep. 15, 2022

(87) PCT Pub. No.: WO2021/184732
PCT Pub. Date: Sep. 23, 2021

(65) Prior Publication Data
US 2023/0245668 A1     Aug. 3, 2023

(30) Foreign Application Priority Data
Mar. 20, 2020   (CN) .......................... 202010200811.1

(51) Int. Cl.
*G10L 21/02*     (2013.01)
*G10L 25/30*     (2013.01)
(Continued)

(52) U.S. Cl.
CPC .............. *G10L 21/02* (2013.01); *G10L 25/30* (2013.01); *G10L 25/45* (2013.01); *G10L 25/60* (2013.01)

(58) Field of Classification Search
None
See application file for complete search history.

(56) References Cited

U.S. PATENT DOCUMENTS

| | | | |
|---|---|---|---|
| 9,514,755 B2 | 12/2016 | Huang et al. | |
| 2011/0208517 A1* | 8/2011 | Zopf | G10L 19/005 704/211 |

(Continued)

FOREIGN PATENT DOCUMENTS

| | | |
|---|---|---|
| CN | 103714821 A | 4/2014 |
| CN | 108111702 A | 6/2018 |

(Continued)

OTHER PUBLICATIONS

International Search Report for corresponding Application No. PCT/CN2020/119063 dated Dec. 30, 2020, 4 pages.

(Continued)

*Primary Examiner* — Richemond Dorvil
*Assistant Examiner* — Alexander G Marlow
(74) *Attorney, Agent, or Firm* — Taft Stettinius & Hollister LLP

(57) ABSTRACT

An audio packet loss repairing method, device and system based on a neural network. The method comprises: obtaining an audio data packet (S101), the audio data packet comprises a plurality of audio data frames, and the plurality of audio data frames at least comprise a plurality of voice signal frames; determining a position of a lost voice signal frame in the plurality of audio data packet to obtain position information of the lost frame (S103), the position comprising a first preset position or a second reset position; select- (Continued)

ing, according to the position information of the lost frame, a neural network model for repairing the lost frame (S105), the neural network model comprising a first repairing model and a second repairing model; and sending the plurality of audio data frames to the selected neural network model so as to repair the lost voice signal frame (S107).

17 Claims, 4 Drawing Sheets

(51) Int. Cl.
*G10L 25/45* (2013.01)
*G10L 25/60* (2013.01)

(56) References Cited

U.S. PATENT DOCUMENTS

| | | |
|---|---|---|
| 2014/0088974 A1 | 3/2014 | Mittal et al. |
| 2015/0255079 A1* | 9/2015 | Huang ............... G10L 19/0017 704/500 |
| 2016/0118053 A1* | 4/2016 | Lecomte ............... G10L 19/005 704/207 |
| 2016/0118054 A1* | 4/2016 | Wang et al. .......... G10L 19/005 704/208 |
| 2019/0051310 A1* | 2/2019 | Chang .................... G10L 25/30 |
| 2021/0125622 A1* | 4/2021 | Zhao ...................... G10L 25/21 |
| 2021/0193111 A1* | 6/2021 | Gonzalez ............... G10L 13/00 |
| 2022/0165280 A1* | 5/2022 | Liang ..................... G10L 25/21 |

FOREIGN PATENT DOCUMENTS

| | | |
|---|---|---|
| CN | 109637540 A | 4/2019 |
| CN | 110534120 A | 12/2019 |

OTHER PUBLICATIONS

International Search Authority form for corresponding Application No. PCT/CN2020/119603 dated Dec. 30, 2020, 1 page.
Written Opinion for corresponding Application No. PCT/CN2020/119063 dated Dec. 30, 2020, 4 pages.

* cited by examiner

NEURAL NETWORK-BASED AUDIO PACKET LOSS RESTORATION METHOD AND APPARATUS, AND SYSTEM

CROSS REFERENCE TO RELATED APPLICATIONS

This is a U.S. National Stage application of, and claims priority to, PCT/CN2020/119603, filed Sep. 30, 2020, which further claims priority to Chinese Patent Application No. 202010200811.1, filed Mar. 20, 2020, the disclosures of which are incorporated herein by reference in their entirety.

TECHNICAL FIELD

The present disclosure relates to the field of audio data processing, and particularly to a neural network-based audio packet loss restoration method and apparatus, and a system.

BACKGROUND

With the popularization of audio and video devices and mobile communication, and the development of Bluetooth technology, people increasingly use a wireless transmitting-receiving data mode to transmit the audio and video data wirelessly, such as Bluetooth speakers, Bluetooth headsets, Bluetooth mice, Bluetooth keyboards, and Bluetooth remote controls, etc.; and more and more Bluetooth products appear in people's lives.

The Bluetooth speakers and Bluetooth headsets mainly apply functions such as Bluetooth calling and Bluetooth music play functions, etc. When the audios are transmitted through the Bluetooth, the audio data is transmitted through the host (mobile phone, computer, etc.) packet by packet to the Bluetooth player to play. During the transmission, since the wireless transmission is often interfered by other wireless signals, or the data packets are lost during the transmission due to obstacles or the distance, if these data is not restored, there is discontinuity or noise at the display terminal. Especially in the Bluetooth call mode, the loss of signals may directly affect the experience of phone calls, and even affect communication in severe cases. Therefore, it is necessary to restore the Bluetooth packet loss data.

For the restoration of the Bluetooth packet loss data, common conventional restoration modes include:
1. Mute processing: lost data is replaced with mute data to avoid other harsh noises. Such mute processing mode is simple but limited in performance, which can only avoid noise but the lost signal cannot be restored.
2. Waveform replacement: a related signal is calculated through a pitch period of a voice signal or other related algorithms, and is replaced with a similar signal. The principle is that the similar waveform can be used for replacement based on the short-term and stability of the speech. But the actual voice signal also has vowels, consonant switching, and constant changes in the speech rate and intonation, so it is difficult to restore such changing signal by replacing with similar signals. In addition, the energy of the voice signal constantly changes, and more additional processing is required to better restore the signal. When the signal loss is serious, the repeated use of similar signals may also lead to the generation of machine sounds.

In order to restore the lost audio data packets, advanced algorithms are often utilized to predict and restore in the prior art. For example, a neural network is adopted to learn the nonlinear model between audio data frames, and then, the lost data is reconstructed in the frequency domain according to the nonlinear model to obtain a time-domain estimate of the currently lost data. In such mode of constructing the nonlinear model, audio data frames received before the current audio data frame are usually utilized to learn the model, thus, the currently lost data is predicted, that is, the following audio data frame is predicted based on the previous frame in the time domain. Although such mode can predict and estimate the lost data to restore the lost data, when the previous audio data frame also involves packet loss, the nonlinear model learned by the neural network is inaccurate, resulting in that the lost audio data frames cannot be accurately predicted based on the model.

Therefore, how to use a new neural network model to restore the lost audio data packets and improve the accuracy of the restoration has become an urgent technical problem to be solved.

SUMMARY

In view of the above, the present disclosure aims to provide a neural network-based audio data packet loss restoration method and apparatus, and a system to restore the lost audio data packet and improve the accuracy of the restoration.

In order to achieve the above purpose, the technical solution of the present disclosure is provided as follows.

According to the first aspect, a neural network-based audio data packet loss restoration method is provided, which includes:

step S101: acquiring an audio data packet, wherein the audio data packet comprises a plurality of audio data frames, the plurality of audio data frames at least comprises a plurality of voice signal frames, and a voice signal frame is an audio data frame comprising a voice signal; step S103: when there is a frame loss situation that a voice signal frame in the plurality of audio data frames is lost, determining a position of a lost voice signal frame in the plurality of audio data frames to obtain position information of the lost frame, the position includes a first preset position or a second preset position; step S105: selecting a neural network model for a restoration of the frame loss situation according to the position information of the lost frame, wherein the neural network model comprises a first restoration model and a second restoration model, the first restoration model is configured to restore a voice signal frame at the first preset position, and the second restoration model is configured to restore a voice signal frame at the second preset position; and step S107: inputting the plurality of audio data frames into the selected neural network model to restore the lost voice signal frame.

Optionally, the plurality of audio data frames further includes a non-voice signal frame, and the method further includes: between the step S101 and the step S103, step S102: distinguishing the voice signal frame from the non-voice signal frame in the plurality of audio data frames according to a preset algorithm; in the step S103, the position information of the lost frame is a position of the lost voice signal frame in a group of voice signal frames, and the group of voice signal frames includes N voice signal frames, wherein N is an integer greater than or equal to five.

Optionally, the step S103 includes: step S1031: sliding an observation window sequentially on the plurality of voice signal frames to group the plurality of voice signal frames, wherein each group of voice signal frames includes N voice signal frames; step S1032: determining whether there is a frame loss situation for voice signal frames within the observation window; step S1033: when there is the frame loss situation for the voice signal frames within the observation window, determining the position of the lost voice signal frame within the observation window, to obtain the position information of the lost frame; step S107: restoring the lost voice signal frame within the observation window.

Optionally, the method further includes:

after the step S107, updating the restored voice signal frame to a position corresponding to the lost frame within the observation window.

Optionally, in the step S1031, the observation window is slid through a sliding mode of an iterative replacement, so that first K voice signal frames within the observation window are slid out of the observation window, and latter K voice signal frames outside the observation window are slid into the observation window, wherein N is an integer greater than or equal to 1.

Optionally, the K is equal to 1.

Optionally, the step S1033 includes: determining that the position of the lost voice signal frame within the observation window does not correspond to the last frame within the observation window and serves as the first preset position; the step S105 comprises: inputting the voice signal frames within the observation window into the first restoration model to restore the lost voice signal frame, wherein data inputted into the first restoration model comprises the last frame within the observation window.

Optionally, the step S1033 includes: determining that there are at least two voice signal frames lost, positions of the lost frames comprise the position of the last frame within the observation window and another position within the observation window, wherein the other position serves as a second preset position; the step S105 comprises: inputting a voice signal frame before the other position in the observation window into the second restoration model to restore the voice signal frame at the other position, wherein data inputted into the second restoration model comprises the voice signal frame before the other position within the observation window and excludes the last frame within the observation window.

Optionally, the method further includes: after the step S102, performing a desalination envelope processing on an audio signal of the non-voice signal frame.

According to the second aspect, a neural network-based audio data packet loss restoration apparatus is provided, which includes: a data acquisition module, configured to acquire an audio data packet, wherein the audio data packet comprises a plurality of audio data frames, and the plurality of audio data frames comprises at least a plurality of voice signal frames, and a voice signal frame is an audio data frame including a voice signal; a position determination module, configured to, when there is a frame loss situation that a voice signal frame in the plurality of audio data frames is lost, determine a position of a lost voice signal frame in the plurality of audio data frames to obtain position information of the lost frame, wherein the position comprises a first preset position or a second preset position; a model selection module, configured to select a neural network model for a restoration of the frame loss situation according to the position information of the lost frame, wherein the neural network model includes a first restoration model and a second restoration model, the first restoration model is configured to a voice signal frame at the first preset position, and the second restoration model is configured to restore a voice signal frame at the second preset position; a data restoration module, configured to input the plurality of audio data frames into the selected neural network model to restore the lost voice signal frame.

Optionally, the plurality of audio data frames further includes a non-voice signal frame, the apparatus further includes: a signal distinguishing module, configured to distinguish the voice signal frame from the non-voice signal frame in the plurality of audio data frames according to a preset algorithm; the position information of the lost frame is a position of the lost voice signal frame in a group of voice signal frames, and the group of voice signal frames comprises N voice signal frames, wherein N is an integer greater than or equal to five.

Optionally, the position determination module includes: a sliding window grouping unit, configured to sequentially slide an observation window on the plurality of voice signal frames to group the plurality of voice signal frames into groups each of which comprises N frames; a frame loss determination unit, configured to determine whether there is a frame loss situation for the voice signal frames within the observation window; and a position acquisition unit, configured to, when there is the frame loss situation for the voice signal frames within the observation window, determine the position of the lost voice signal frame in the observation window to obtain the position information of the lost frame; the data restoration module is configured to restore the lost voice signal frame within the observation window.

Optionally, the apparatus further includes: a data updating module, configured to update the restored voice signal frame to the position corresponding to the lost frame in the observation window.

Optionally, the sliding window grouping unit is configured to slide the observation window in a sliding mode of an iterative replacement, so that first K voice signal frames within the observation window are slid out of the observation window, and latter K voice signal frames outside the observation window are slid into the observation window, wherein N is an integer greater than or equal to 1.

Optionally, the K is equal to 1.

Optionally, the position acquisition unit is configured to determine that the position of the lost voice signal frame in the observation window does not correspond to the last frame within the observation window and serves as the first preset position; the model selection module is configured to input the voice signal frames within the observation window into the first restoration model to restore the lost voice signal frame, wherein data inputted into the first restoration model comprises the last frame within the observation window.

Optionally, the position acquisition unit is configured to determine that there are at least two voice signal frames lost, positions of the lost frames include a position of the last frame within the observation window and another position within the observation window, wherein the other position serves as the second preset position; the model selection module is configured to input a voice signal frame before the other position in the observation window into the second restoration model to restore the voice signal frame at the other position, wherein data inputted into the second restoration model includes the voice signal frame before the other position within the observation window and excludes the last frame within the observation window.

Optionally, the apparatus further includes: a desalination envelope module, configured to perform a desalination envelope processing on an audio signal of the non-voice signal frame.

Optionally, the neural network model includes a first restoration model and a second restoration model, and the neural network training device includes: a sample acquisition module configured to acquire voice signal sample data to be learned, the voice signal sample data being grouped by N voice signal frames, N being an integer greater than or equal to 5, and the voice signal frame being an audio data frame including a voice signal; a first elimination module configured to eliminate a first voice signal frame at a first preset position in each group of N voice signal frames to obtain a first input sample; a second elimination module configured to eliminate a voice signal frame at a second preset position in each group of N voice signal frames to obtain a second input sample; a training module, configured to input the first input sample into the first restoration model and input the second input sample into the second restoration model respectively, to train the first restoration model and the second restoration model respectively; where the first restoration model is configured to restore the voice signal frame at the first preset position, and the second restoration model is configured to restore the voice signal frame at the second preset position.

Optionally, the training module is configured to train the first restoration model and the second restoration model respectively includes: training the first restoration model and the second restoration model through repeated iterations.

Optionally, the training module includes a first training unit and/or a second training unit, where the first training unit is configured to repeatedly and iteratively train the first restoration model, including: obtaining the i-th voice signal frame after the i-th iteration, where i is a positive integer; determining whether a first error between the i-th voice signal frame and the eliminated voice signal frame at the first preset position is within a preset range, if the first error is within the preset range, outputting a model parameter obtained by the i-th iteration to solidify the first restoration model; the second training unit is configured to repeatedly and iteratively train the second restoration model, including: obtaining the j-th voice signal frame after the j-th iteration, where j is a positive integer, determining whether a second error between the j-th voice signal frame and the eliminated voice signal frame at the second preset position is within a preset range, if the second error is within the preset range, outputting a model parameter obtained by the j-th iteration to solidify the second restoration model.

Optionally, the sample acquisition module is configured to group the voice signal sample data by N voice signal frames through an observation window with a preset length, and execute the first elimination module, the second elimination module and the training module within the observation window.

Optionally, the first preset position is in the observation window and does not correspond to the last frame in the observation window; the training module is configured to train the first restoration model with the voice signal frames before and after the first preset position in the observation window.

Optionally, the first preset position is not the first frame within the observation window.

Optionally, the second preset position includes a position corresponding to the last frame in the observation window; the training module is configured to train the second restoration model with the voice signal frames before the first preset position in the observation window.

According to the third aspect, the present disclosure further provides an audio device, including: a processor for implementing the method according to any one of the above aspects.

Optionally, the audio device is a headset, a mobile terminal or a smart wearable device having an audio playback function.

According to the fourth aspect, the present disclosure provides an audio signal interaction system, including: a first device and a second device, where the first device is configured to transmit an audio data packet to the second device, the second device is configured to implement the method according to any one of the above aspects.

Optionally, the first device is a mobile terminal, and the second device is a headset.

According to the fifth aspect, the present disclosure provides a computer-readable storage medium, on which a computer program is stored, the computer program stored in the storage medium is executed to implement the method according to any one of the above aspects.

According to the sixth aspect, the present disclosure provides a chip for an audio device having an integrated circuit thereon, the integrated circuit is designed to implement the method according to any one of c the above aspects.

According to a neural network training method and an audio packet loss restoration method and apparatus, and a system disclosed in the embodiments of the present disclosure, the acquired audio data packet includes a plurality of audio data frames; when the plurality of audio data frames include the frame loss situation of the loss of the voice signal frame, the position of the lost voice signal frame in the plurality of audio data frames is determined to obtain the position information of the lost frame; and then the neural network model for restore the frame loss situation is selected according to the position of the lost frame, and the plurality of audio data frames are inputted into the selected neural network model to restore the lost voice signal frame. Since the first restoration model and the second restoration model are respectively adapted to restore voice signal frames at different frame loss positions, after the position of the lost voice signal frame is determined, the corresponding restoration model can be selected according to the position of the lost frame. Compared to the prior art in which the same restoration model is adopted to restore different frame loss situations, the solution of the embodiment of the present disclosure can be adapted to select a restoration model, accordingly the restoration of the lost voice signal frame is more targeted, thereby improving the accuracy of the restoration.

As an optional solution, the voice signal frame and non-voice signal frame in the plurality of audio data frames are distinguished according to a preset algorithm, and the position information of the lost frame is the position of the lost voice signal frame in a group of voice signal frames, therefore, it is possible to restore the lost packet data of the voice signal frame, thereby reducing the interference caused by the non-voice signal frame and improving the accuracy of the restoration.

As an optional solution, by sliding the observation window sequentially on the plurality of voice signal frames, the restored voice signal frame is updated to the position corresponding to lost frame in the observation window, so that the data inputted into the restoration model is complete, thereby completing the reference data inputted into the restoration model, and improving the accuracy of the restoration.

As an optional solution, the observation window is slid through an iterative replacement mode, so that the first K voice signal frames in the observation window are slid out of the observation window, and the later K voice signal frames outside the observation window are slid into the observation window, thus the amount of data inputted into the neural network can be guaranteed. Accordingly, the first K voice signal frames in the observation window are slid out of the observation window, which can reduce the extra delay of output data of the system, that is, the voice signal frames can be outputted timely.

As an optional solution, since the non-voice signal frame includes less useful information, the desalination envelope processing is performed on the audio signal of the non-voice signal frame, accordingly, the data processing efficiency can be improved; and since the non-voice signal frame is not inputted into the restoration model, the restoration and training pressures of the neural network on the voice signal frame are reduced and the accuracy of the restoration is improved.

Other advantages of the present disclosure will be illustrated in the specific embodiments through the introduction of specific technical limitations and technical solution. Those skilled in the art should be able to understand the advantages resulted in by the technical limitations and technical solution through the introduction of these technical limitations and technical solution.

BRIEF DESCRIPTION OF THE DRAWINGS

Embodiments of the present disclosure will be described below with reference to the accompanying drawings. In the figures:

FIGS. 5A and 5B are schematic diagrams of examples eliminating a preset position according to embodiments of the present disclosure, in which FIG. 5A is a schematic diagram of an example eliminating a first preset position according to an embodiment of the present disclosure, and FIG. 5B is a schematic diagram of an example eliminating a second preset position according to an embodiment of the present disclosure.

DETAILED DESCRIPTION

Figure 1:
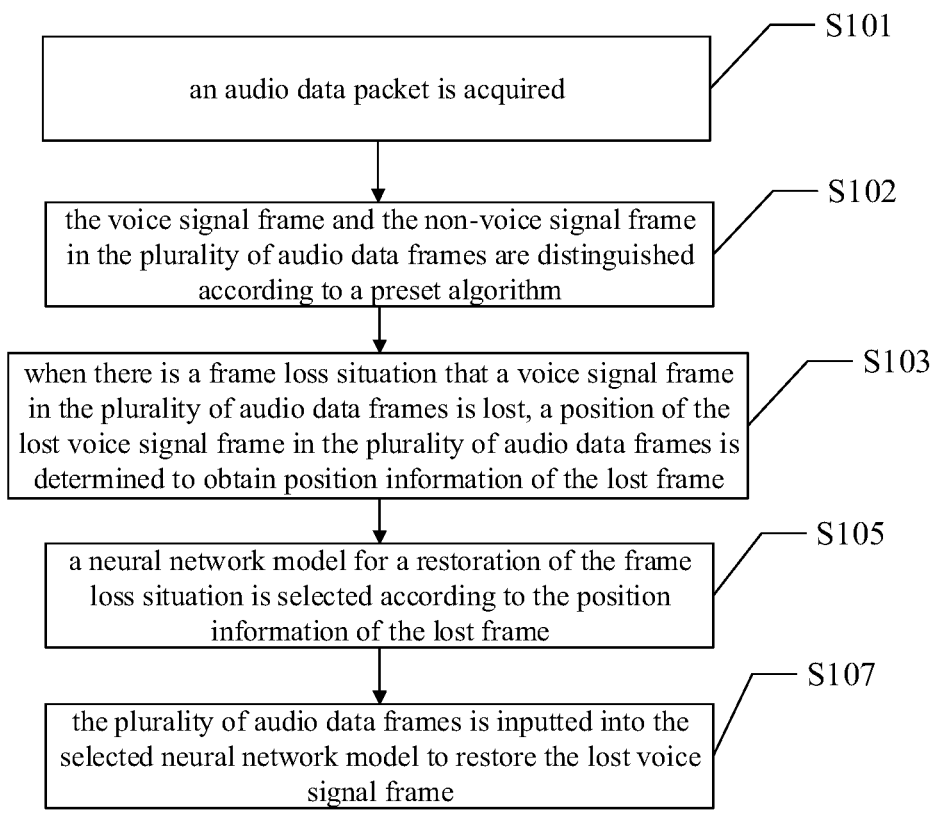
FIG. 1 is a flow chart showing a neural network-based audio data packet loss restoration method according to an embodiment of the present disclosure.

In order to use a new neural network model to restore the lost audio data packets and improve the accuracy of the restoration, in the embodiment a neural network-based audio data packet loss restoration method is provided. Referring to FIG. 1, which is a flow chart showing a neural network-based audio data packet loss restoration method, and the audio data packet loss restoration method includes following steps.

Step S101: an audio data packet is acquired. In the embodiment, the so-called audio data packet includes a plurality of audio data frames, and the plurality of audio data frames include at least a plurality of voice signal frames, in which a voice signal frame is an audio data frame including a voice signal. Specifically, the plurality of audio signal frames may include some pure voice signal frames, or may include some pure noise signal frames, or may include some frames including both the voice signals and the noise signals, that is to say, the noise signal and the voice signal may exist simultaneously in the same frame. In a specific implementation process, the audio data packet has packet header information; and a serial number of different audio data frame can be distinguished according to the packet header information.

Step S103: when there is a frame loss situation that a voice signal frame in the plurality of audio data frames is lost, a position of the lost voice signal frame in the plurality of audio data frames is determined to obtain position information of the lost frame. In a specific embodiment, it is possible to determine whether there is the frame loss situation of the loss of the voice signal frame through the existing modes. For example, a statistic of a time-frequency characteristic of the voice signal frame is performed, and a lost characteristic can be estimated according to a statistical quantity. In such way, it can be determined whether there is the loss of the voice signal frame; when there is the frame loss situation of the loss of the voice signal frame, the position of the voice signal frame can be determined according to the statistical result. The position includes a first preset position or a second preset position. Specifically, specific positions of the first preset position and the second preset position are different. In the embodiment, the so-called position information can be represented by a frame number, which can be a frame number of the lost voice signal frame in the plurality of audio data frames, or a frame number in the plurality of voice signal frames, or a frame number in the same group of voice signal frames.

Step S105: a neural network model for a restoration of the frame loss situation is selected according to the position information of the lost frame. In the embodiment, the neural network model includes a first restoration model and a second restoration model. The first restoration model and the second restoration model are respectively adapted to restore voice signal frames at different frame loss positions. In the embodiment, the situation of the frame loss position is distinguished, and for different frame loss positions, the first restoration model or the second restoration model is selected to restore the lost signal frame, so that the restoration of the lost signal frame is targeted, accordingly, the accuracy of the restoration is improved.

It should be noted that in the process of training the neural network, different input samples can be utilized to train the restoration model, so that weights and parameters of the first restoration model and the second restoration model can be obtained by training respectively. For details, reference can be made to the following description.

Step S107: the plurality of audio data frames is inputted into the selected neural network model to restore the lost voice signal frame. In the specific implementation process, after the first restoration model or the second restoration model is selected to restore the lost voice signal frame and obtain corresponding voice signal data, the voice signal data obtained through the restoration can be inserted into the position of the lost signal frame to obtain a complete voice signal; and the complete voice signal is transmitted to the audio output device to play the voice signal. In the embodiment, the first restoration model is configured to restore the voice signal frame at the first preset position; and the second restoration model is configured to restore the voice signal frame at the second preset position; that is, the first restoration model is obtained by training the samples excluding a sample at the first preset position; and the second restoration model is obtained by training the samples excluding a sample at the second preset position.

The plurality of audio data frames includes a voice signal frame and a non-voice signal frame. In order to screen out the voice signal frame and improve the pertinence of the restoration, in an optional embodiment, referring to FIG. 1, between the step S101 and step S103, the method further includes the following step.

Step S102: the voice signal frame and the non-voice signal frame in the plurality of audio data frames are distinguished according to a preset algorithm. In the embodiment, the specific preset algorithm is not limited, which may be, for example, a neural network algorithm or other spectrum analysis methods, as long as it can distinguish the voice signal frame from the non-voice signal frame. As an example, after the audio data is acquired, the acquired audio data is transmitted to a pre-neural network algorithm, to distinguish whether each audio data frame is a voice signal frame or a non-voice signal frame through the pre-neural network algorithm.

In order to reduce the restoration and training pressures of the neural network on the voice signal frame and improve the accuracy of the restoration, in an optional embodiment, after the step S102, the method further includes: a desalination envelope processing is performed on an audio signal of the non-voice signal frame. In the embodiment, the so-called desalination envelope processing may be a simple copy replacement or simple fade in and fade out. In the embodiment, since the non-voice signal frame includes less useful information, the desalination envelope processing performed on the audio signal of the non-voice signal frame can improve the data processing efficiency. In addition, since the non-voice signal frame is not inputted to the restoration model, the pressures of the neural network to restore and train the voice signal frames can be reduced, and the accuracy of the restoration is improved.

In an optional embodiment, in the step S103, the position information of the lost frame is the position of the lost voice signal frame in a group of voice signal frames, and the group of voice signal frames includes N voice signal frames, in which N is an integer greater than or equal to five. Specifically, after the voice signal frames and non-voice signal frames are distinguished, the voice signal frames can be grouped to obtain a plurality of groups of voice signal frames, each group of voice signal frames includes N voice signal frames, and then the position of the lost voice signal in the group is determined, for example, a frame number in the group.

Figure 2:
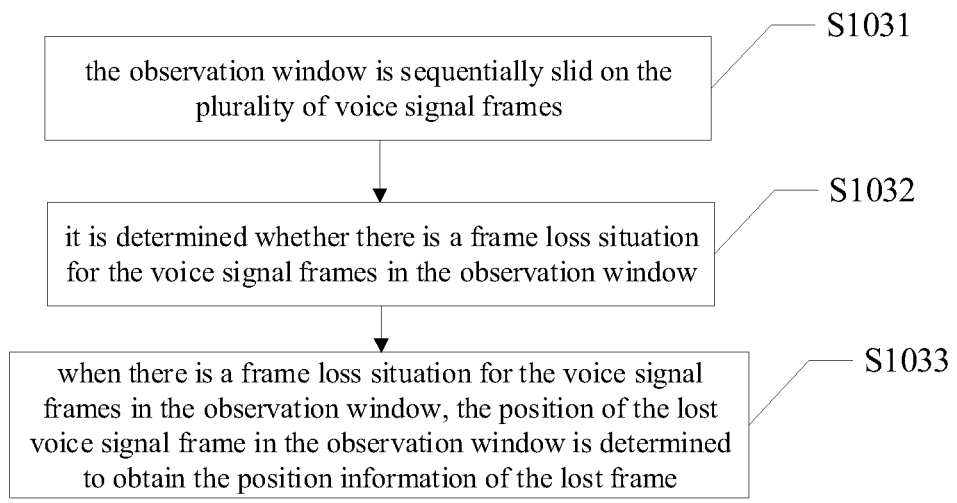
FIG. 2 is a flow chart showing a method for determining a position of frame loss through an observation window according to an embodiment of the present disclosure.

In the specific implementation process, each group of voice signal frames can be divided by means of an observation window. Specifically, referring to FIG. 2, which is a flow chart showing a method for determining a frame loss position through an observation window according to an embodiment of the disclosure, and the method includes following steps.

Step S1031: the observation window is sequentially slid on the plurality of voice signal frames. In the embodiment, an observation window with a preset length N can be slid, so that the plurality of voice signal frames is grouped, each group includes N frames, that is, the length of the observation window is the number of the voice signal frames in the group.

Step S1032: it is determined whether there is a frame loss situation for the voice signal frames in the observation window. Specifically, after the observation window is slid to include N voice signal frames, the statistic of the time-frequency characteristics can be performed in the observation window, and the lost characteristics can be estimated according to the statistical quantity, and accordingly it can be determined whether there is a loss of voice signal data in the voice signal frames in the observation window.

Step S1033: when there is a frame loss situation for the voice signal frames in the observation window, the position of the lost voice signal frame in the observation window is determined, to obtain the position information of the lost frame. In the embodiment, the position information of the lost frame refers to the position of the lost voice signal frame in the observation window. In the embodiment, the position in the observation window may be a frame number in the observation window, that is, the frame number of the lost voice signal in the observation window.

In the embodiment, the observation window is adopted to determine the lost signal frame; alternatively, the lost voice signal frame may also be restored in the observation window, that is, the step S107 includes: the lost voice signal frame is restored in the observation window.

In an optional embodiment, after the step S107 is performed, the method may further include: the restored voice signal frame is updated to the position corresponding to the lost frame in the observation window. Specifically, after it is determined that the data of a certain voice signal frame in the observation window is lost, the data of the lost voice signal frame is restored through the selected restoration model, and then the restored data is updated to the position where the lost frame is located. In the embodiment, the restored data is updated to the corresponding position of the lost frame in the observation window, which can complete the data of the voice signal frames in the observation window, so that the data inputted into the restoration model is not missing, and the reference data inputted into the restoration model is completed, and accordingly the accuracy of the restoration is improved.

In order to ensure the quantity of the data inputted into the neural network and reduce the extra delay of the output data of the system, in an optional embodiment, when the step S1031 is performed, the observation window can be slid through a sliding mode of iterative replacement, so that the first K voice signal frames in the observation window are slid out of the observation window, and the latter K voice signal frames outside the observation window are slid into the observation window, where N is an integer greater than or equal to 1, and a value of K can be 1.

Figure 3:
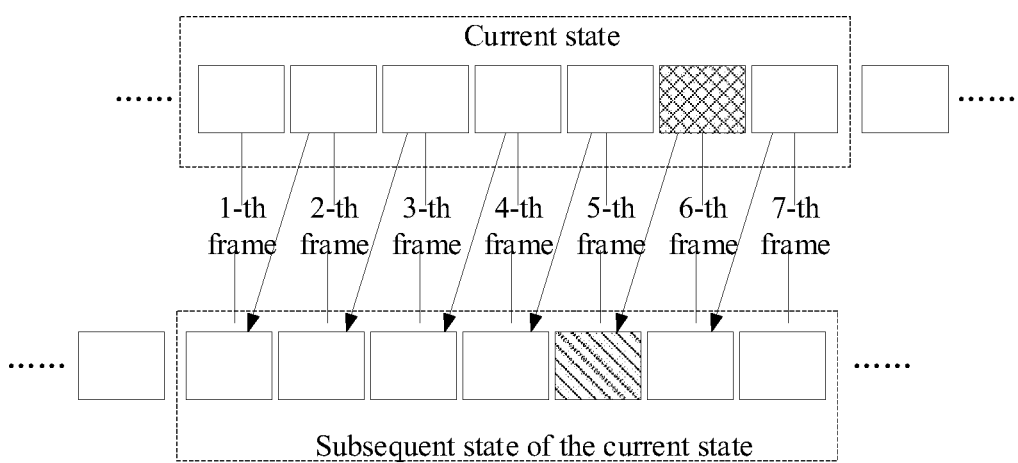
FIG. 3 is an exemplary schematic diagram of sliding window and grouping restoration according to an embodiment of the present disclosure.

In order to facilitate the understanding of those skilled in the art, as an example, the preset length of the observation window is exemplarily seven frames, that is, N=7, and the value of K is, for example, 1. Referring to FIG. 3, which is an exemplary schematic diagram of sliding window and grouping restoration. In the FIG. 3, the dotted box indicates an observation window with a preset length. The processing process of sliding window and grouping restoration on the voice signal frames through the observation window is provided as follows.

(1) In a current state, the observation window covers the voice signal frames numbered 1 to 7, and the lost voice signal frame is the sixth frame, as shown in a grid line box in FIG. 3.

(2) The first restoration model or the second restoration model is selected as the restoration neural network model based on the position information of the lost frame.

(3) The voice signal frames with the numbers 1 to 5 and 7 are inputted into the selected neural network model, and data of the sixth voice signal frame is restored through the selected neural network model.

(4) The voice signal data obtained by the restoration is updated to the position of the sixth frame within the observation window in the current state, as shown in the grid line box of FIG. 3, accordingly the data of the voice signal frames within the observation window in the current state is completed.

(5) After the restoration, the first voice signal frame in the observation window is slid out of the observation window, and meanwhile the later voice signal frame outside the observation window is slid into the observation window; at the moment, a subsequent state of the current state is entered; in the state, the voice signal frames originally numbered 2 to 7 are sequentially numbered 1 to 6 (as shown by the arrow lines in FIG. 3), and a voice signal frame newly slid into the observation window is numbered 7.

In the subsequent state of the current state, if it is required to restore the lost voice signal frame, since the data at the position of the original sixth frame (that is the fifth frame in this state, as shown by an oblique line box in the FIG. 3) is updated, the data of the fifth voice signal frame in this state can also serve as the input of the restoration model.

In a specific embodiment, when the step S1033 is performed, it is determined that whether the lost voice signal frame includes the last frame in the observation window.

Specifically, in an embodiment, the step S1033 includes: it is determined that the position of the lost voice signal frame in the observation window does not correspond to the last frame in the observation window, that is, the data of the last voice signal frame in the observation window is not lost, and what is lost is the signal frame at a middle section of the observation window, and the position of the lost signal frame at the middle section serves as a first preset position. At the moment, when the step S105 is performed, the step S105 includes: the voice signal frames in the observation window are inputted into the first restoration model to restore the lost voice signal frame, in which the data inputted into the first restoration model includes the data of the last frame in the observation window. Specifically, the voice signal frames before and after the lost voice signal frame in the observation window are inputted to the first restoration model, and the first restoration model restores the lost voice signal frame according to the voice signal frames before and after the lost voice signal frame. As an example, assuming that the data lost in the observation window is the sixth frame, the voice signal frames numbered 1 to 5 and the seventh frame are inputted into the first restoration model, and the first restoration model restores the sixth voice signal frame based on the voice signal frames numbered 1 to 5 and 7.

In another embodiment, the step S1033 includes: it is determined that there are at least two voice signal frames lost, positions of the lost frames include a position of the last frame within the observation window and another position within the observation window, and the other position of the lost frame serves as a second preset position. At the moment, when the step S105 is performed, the step S105 includes: a voice signal frame before the other position in the observation window is inputted into the second restoration model to restore the voice signal frame at the other position; the data inputted into the second restoration model includes the voice signal frame before the other position within the observation window and excludes the last frame within the observation window. Specifically, the voice signal frame before the lost voice signal frame in the observation window is inputted to the second restoration model, and the second restoration model restores the lost voice signal frame according to the voice signal frame before the lost voice signal frame. As an example, assuming that the data lost in the observation window is the sixth frame and the seventh frame, i.e., the last frame, the voice signal frames numbered 1 to 5 are inputted into the second restoration model, and the second restoration model restores the sixth voice signal frame according to the voice signal frames numbered 1 to 5. Of course, in some embodiments, the voice signal data of the seventh frame, i.e., the last frame in the observation window may also be synchronously restored.

Figure 4:
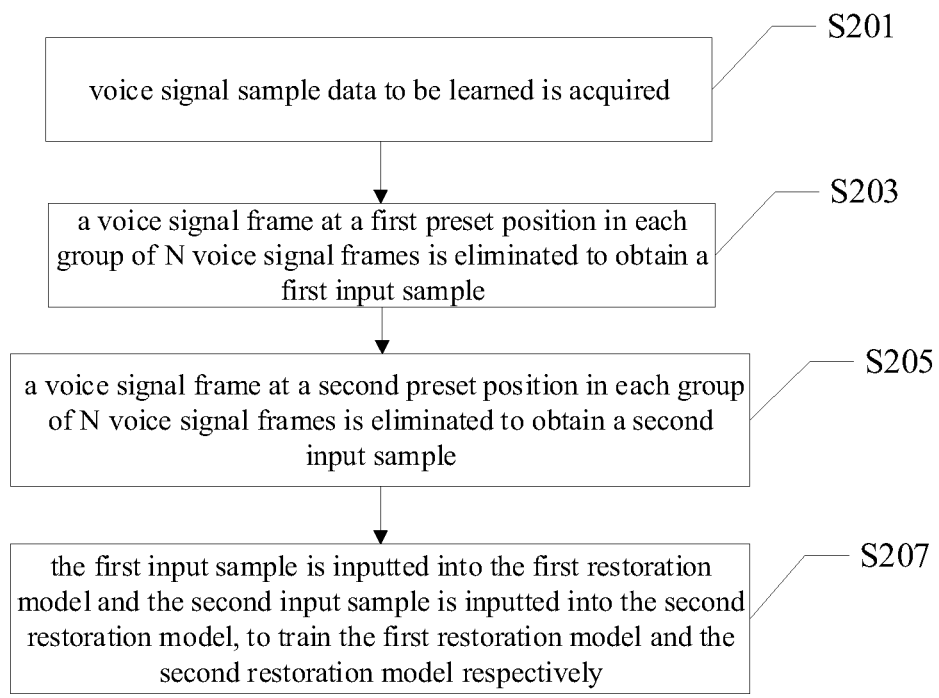
FIG. 4 is a flow chart of a neural network training method for audio packet loss restoration according to an embodiment of the present disclosure.

In order to facilitate the understanding of those skilled in the art, a neural network training method for an audio packet loss restoration is provided in an embodiment. In the embodiment, the trained neural network model is adapted to the above-mentioned packet loss restoration method. The neural network model includes a first restoration model and a second restoration model. Referring to FIG. 4, which is a flow chart showing the neural network training method for the audio packet loss restoration disclosed in the embodiment. The neural network training method includes following steps.

Step S201: voice signal sample data to be learned is acquired. In the embodiment, in the so-called voice signal sample data, N voice signal frames form one group, where N is an integer greater than or equal to five; and the voice signal frame is an audio data frame including a voice signal. In the specific implementation process, the voice signal frames that have been grouped can be directly acquired as voice signal sample data; alternatively, the voice signal sample data can be grouped with N voice signal frames as a group after the voice signal sample data is acquired.

Step S203: a voice signal frame at a first preset position in each group of N voice signal frames is eliminated to obtain a first input sample. In the embodiment, the so-called first preset position refers to a position within the group, and specifically is represented by a sequence number of a voice signal frame within the group.

Step S205: a voice signal frame at a second preset position in each group of N voice signal frames is eliminated to obtain a second input sample. In the embodiment, the so-called second preset position refers to a position within the group, and specifically is represented by a sequence number of a voice signal frame within the group. In the embodiment, the first preset position is different from the second preset position.

Step S207: the first input sample is inputted into the first restoration model and the second input sample is inputted into the second restoration model, to train the first restoration model and the second restoration model respectively. In the embodiment, the first restoration model and the second restoration model are respectively adapted to restore voice signal frames at different frame loss positions. It should be noted that, in the embodiment, a training sequence of the first restoration model and the second restoration model is not limited; the first restoration model and the second restoration model can be trained separately or synchronously on the same PC terminal.

In the specific implementation process, the first restoration model and/or the second restoration model can be trained respectively by, for example, a repeated iteration mode. Of course, other modes can also be adopted to respectively train the first restoration model and the second restoration model to obtain model parameters of the first restoration model and the second restoration model, such as weights, coefficients, etc.; then the first restoration model and the second restoration model can be stored in a storage device, so that the relevant restoration model can be invoked when the lost voice signal frame is restored.

In the specific implementation process, samples can be grouped by using the same grouping mode as the above-mentioned packet loss restoration method. Specifically, the step S201 includes: the voice signal sample data is grouped with N voice signal frames as a group through the observation window with a preset length, that is, the observation window with a length of N frames slides on the voice signal sample data, thereby dividing the voice signal sample data into a group of N frames; then, steps S203, S205 and S207 are performed in the observation window.

Figure 5A:
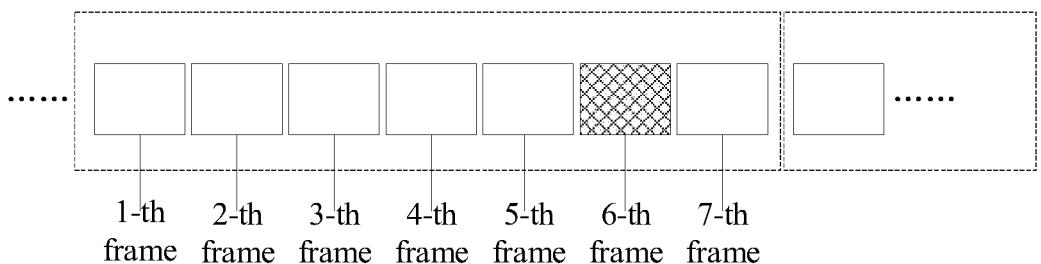

In a specific embodiment, when the step S203 is performed, the first preset position is located within the observation window and does not correspond to the last frame in the observation window; and the first restoration model is trained with the voice signal frames located before and after the first preset position in the observation window. That is, the data of the last voice signal frame in the observation window is not eliminated, but a signal frame in the middle section of the observation window is eliminated. At the moment, when the step S203 is performed, the voice signal frames within the observation window are inputted into the first restoration model to train the first restoration model, that is, the first input sample for training the first restoration model includes the last frame in the observation window. Specifically, that is, the voice signal frames before and after the eliminated voice signal frame in the observation window are inputted into the first restoration model, and the first restoration model is trained according to the voice signal frames before and after the eliminated voice signal frame to obtain the eliminated voice signal frame. Referring to FIG. 5A, which is a schematic diagram of an example eliminating a first preset position according to an embodiment. In FIG. 5A, a dotted box is an observation window with a preset length. Assuming N=7, the observation window includes voice signal frames numbered 1 to 7. Assuming that the data eliminated in the observation window is the sixth frame, then the voice signal frames numbered 1 to 5 and the seventh frame serve as a first input sample and the first input sample is inputted into the first restoration model; the first restoration model is iteratively trained according to the voice signal frames numbered 1 to 5 and 7 to obtain the sixth voice signal frame.

In an optional embodiment, the first preset position is not a first frame within the observation window. As a preferred embodiment, according to the description of the above embodiment, considering that the lost voice signal frame is restored by a mode of sliding a window, after the lost data is restored, the data within the observation window can be updated and completed. Therefore, in a preferred embodiment, the first preset position may preferably be a rear position in the observation window, such as the (N−1)-th frame.

Figure 5B:
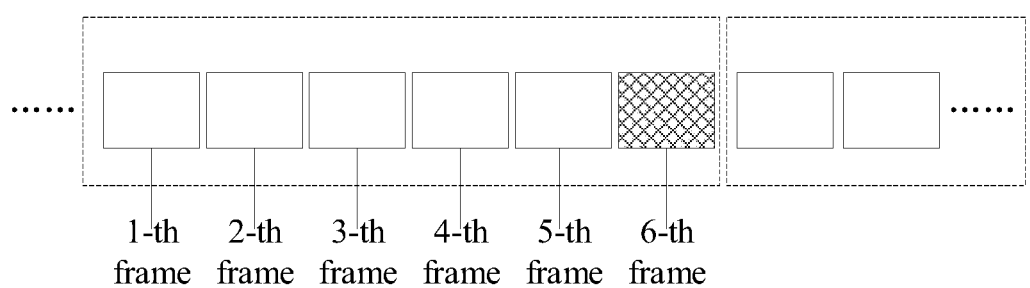

In a specific embodiment, when the step S203 is performed, the second preset position is located at the last frame in the observation window; the second restoration model is trained by the voice signal frames before the second preset position in the observation window. That is, the data of the last voice signal frame within the observation window is eliminated. At the moment, when the step S203 is performed, the voice signal frames in the observation window are inputted into the second restoration model to train the second restoration model. Specifically, the voice signal frames before the eliminated voice signal frame (at the second preset position) in the observation window are inputted into the second restoration model; and the second restoration model is trained according to the voice signal frames before the eliminated voice signal frame to obtain the eliminated voice signal frame, that is, the voice signal frame at the second preset position is obtained by training through a forward prediction mode. Referring to FIG. 5B, which is a schematic diagram of an example eliminating a second preset position according to an embodiment. In FIG. 5B, a dotted box is an observation window with a preset length. Assuming N=6, the observation window includes voice signal frames numbered 1 to 6. Assuming that the data eliminated in the observation window is the sixth frame, the voice signal frames numbered 1 to 5 before the sixth frame serve as a second input sample, and then the second input sample is inputted into the second restoration model; the second restoration model is iteratively trained according to the voice signal frames numbered 1 to 5 to obtain the sixth voice signal frame.

Figure 6:
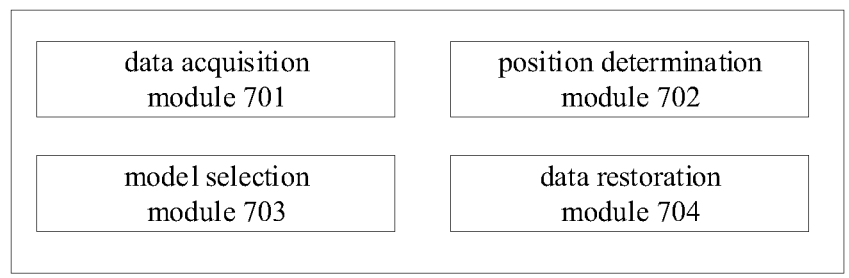
FIG. 6 is a schematic structure diagram of a neural network-based audio data packet loss restoration apparatus according to an embodiment of the present disclosure.

In an embodiment, a neural network-based audio data packet loss restoration apparatus is provided. Referring to FIG. 6, which is a schematic structure diagram of a neural network-based audio data packet loss restoration apparatus disclosed in the embodiment. The audio data packet loss restoration apparatus includes: a data acquisition module 701, a position determination module 702, a model selection module 703 and a data restoration module 704.

The data acquisition module 701 is configured to acquire an audio data packet; the audio data packet includes a plurality of audio data frames, and the plurality of audio data frames include at least a plurality of voice signal frames, in which a voice signal frame is an audio data frame including a voice signal. The position determination module 702 is configured to, when there is a frame loss situation that a voice signal frame in the plurality of audio data frames is lost, determine a position of the lost voice signal frame in the plurality of audio data frames to obtain position information of the lost frame. The model selection module 703 is configured to select a neural network model for a restoration of the frame loss situation according to the position information of the lost frame; the neural network model includes a first restoration model and a second restoration model; the first restoration model and the second restoration model are respectively adapted to restore voice signal frames at different frame loss positions. The data restoration module 704 is configured to input the plurality of audio data frames into the selected neural network model to restore the lost voice signal frame.

In an optional embodiment, the plurality of audio data frames further includes a non-voice signal frame; the audio data packet loss apparatus further includes a signal distinguishing module, which is configured to distinguish the voice signal frame from the non-voice signal frame in the plurality of audio data frames according to a preset algorithm. The position information of the lost frame is a position of the lost voice signal frame in a group of voice signal frames, and the group of voice signal frames includes N voice signal frames, in which N is an integer greater than or equal to five.

In an optional embodiment, the position determination module includes: a sliding window grouping unit, which is configured to sequentially slide an observation window on the plurality of voice signal frames, to group the plurality of voice signal frames into groups each of which includes N frames; a frame loss determination unit, which is configured to determine whether there is a frame loss situation for the voice signal frames in the observation window; and a position acquisition unit, which is configured to, when there is a frame loss situation for the voice signal frames in the observation window, determine the position of the lost voice signal frame in the observation window to obtain the position information of the lost frame. The data restoration module is configured to restore the lost voice signal frame in the observation window In an optional embodiment, the audio data packet loss restoration apparatus further includes: a data updating module configured to update the restored voice signal frame to the position corresponding to the lost frame in the observation window.

In an optional embodiment, the sliding window grouping unit is configured to slide the observation window in a sliding mode of iterative replacement, so that the first K voice signal frames in the observation window are slid out of the observation window, and the latter K voice signal frames outside the observation window are slid into the observation window, where N is an integer greater than or equal to 1.

In an optional embodiment, a value of K is equal to 1.

In an optional embodiment, the position acquisition unit is configured to determine that the position of the lost voice signal frame in the observation window does not correspond to the last frame within the observation window. The model selection module is configured to input the voice signal frames within the observation window into the first restoration model to restore the lost voice signal frame, in which the data inputted into the first restoration model includes the last frame within the observation window.

In an optional embodiment, the position acquisition unit is configured to determine that there are at least two voice signal frames lost, positions of the lost frames include a position of the last frame within the observation window and another position within the observation window. The model selection module is configured to input a voice signal frame before the other position in the observation window into the second restoration model to restore the voice signal frame at the other position, in which the data inputted into the second restoration model includes the voice signal frame before the other position within the observation window and excludes the last frame within the observation window.

In an optional embodiment, the audio data packet loss restoration apparatus further includes a desalination envelope module configured to perform a desalination envelope processing on an audio signal of a non-voice signal frame.

In an embodiment, an audio device is further provided. The audio device is a device having an audio data collection function. Specifically, the audio device may be, for example, a headset, a mobile terminal, or a smart wearable device. The audio device includes: a processor for implementing the neural network-based audio data packet loss restoration method provided in any of the above embodiments.

In an embodiment, an audio signal interaction system is further provided, which includes a first device and a second device.

The first device is configured to transmit an audio data packet to the second device; the second device is configured to implement the neural network-based audio data packet loss restoration method provided in any of the above-mentioned embodiments.

In an optional embodiment, the first device is a mobile terminal, and the second device is a headset. The mobile terminal may be a terminal with a data processing function, such as a tablet computer, a mobile phone, a notebook computer, etc.

In an embodiment, a computer-readable storage medium is further provided, on which a computer program is stored, and the computer program stored in the storage medium is configured to be executed to implement the neural network-based audio data packet loss restoration method provided in any of the above-mentioned embodiments.

According to the neural network-based audio packet loss restoration method and apparatus, and the system disclosed in the embodiments, the acquired audio data packet includes a plurality of audio data frames, and when there is a frame loss situation that a voice signal frame in the plurality of audio data frames is lost, a position of the lost voice signal frame in the plurality of audio data frames is determined to obtain position information of the lost frame; and then, a neural network model configured to restore the lost frame is selected according to the position information of the lost frame; and the plurality of audio data frames are inputted into the selected neural network model to restore the lost voice signal frame. Since the first restoration model and the second restoration model are respectively adapted to restore voice signal frames at different frame loss positions, after the position of the lost voice signal frame is determined, the corresponding restoration model can be selected according to the position of the lost frame. Compared to the prior art in which the same restoration model is utilized to restore different frame loss situations, the solution of the embodiment of the present disclosure can be adapted to select a restoration model, and the restoration of the lost voice signal frame is more targeted, thereby improving the accuracy of the restoration.

As an optional embodiment, the voice signal frames and the non-voice signal frames in the plurality of audio data frames are distinguished according to a preset algorithm; and the position information of the lost frame is a position of the lost voice signal frame in a group of voice signal frames, therefore, it is possible to restore the lost packet data of the voice signal frame, thereby reducing the interference caused by the non-voice signal frame, and improving the accuracy of the restoration.

As an optional embodiment, by sequentially sliding the observation window on the plurality of voice signal frames, and the restored voice signal frame is updated to the position corresponding to the lost frame in the observation window, so that the data inputted into the restoration model is complete, thereby completing the reference data inputted into the restoration model, and improving the accuracy of the restoration.

As an optional embodiment, a sliding mode of iterative replacement is adopted to slide the observation window, so that the first K voice signal frames within the observation window are slid out of the observation window, and the later K voice signal frames outside the observation window are slid into the observation window, which can ensure the amount of data inputted into the neural network. Accordingly, the first K voice signal frames in the observation window are slid out of the observation window, which can reduce the extra delay of the output data of the system, that is, the voice signal frame can be output timely.

As an optional embodiment, since the non-voice signal frame includes less useful information, the desalination envelope processing of the audio signal of the non-voice signal frame can improve the data processing efficiency; and since the non-voice signal frame is not inputted into the restoration model, the pressures of the neural network to restore and train the voice signal frames can be reduced, and the accuracy of the restoration is improved.

Those skilled in the art can understand that, under the premise of no conflict, the above preferred solutions can be freely combined and superimposed.

It should be understood that the above-mentioned embodiments are merely exemplary rather than restrictive, and those skilled in the art can make various obvious or equivalent modifications or replacements to the above-mentioned details without departing from the basic principles of the present disclosure, which all fall within the scope of the claims of the present disclosure.

What is claimed is:

1. A neural network-based audio data packet loss restoration method, applied to an audio device comprising a processor, the method comprising:
   step s101: acquiring, by the processor, an audio data packet, wherein the audio data packet comprises a plurality of audio data frames, the plurality of audio data frames at least comprises a plurality of voice signal frames, and a voice signal frame is an audio data frame comprising a voice signal;
   step s102: distinguishing, by the processor, the voice signal frame from the non-voice signal frame in the plurality of audio data frames according to a preset algorithm;
   step s103: when there is a frame loss situation that a voice signal frame in the plurality of audio data frames is lost, determining, by the processor, a position of a lost voice signal frame in the plurality of audio data frames to obtain position information of the lost frame, the position comprises a first preset position or a second preset position, wherein the position information of the lost frame is a position of the lost voice signal frame in a group of voice signal frames, and the group of voice signal frames comprises N voice signal frames, wherein N is an integer greater than or equal to five;
   step s105: selecting, by the processor, a neural network model for a restoration of the frame loss situation according to the position information of the lost frame, wherein the neural network model comprises a first restoration model and a second restoration model, the first restoration model is configured to restore a voice signal frame at the first preset position, and the second restoration model is configured to restore a voice signal frame at the second preset position; and
   step s107: inputting, by the processor, the plurality of audio data frames into the selected neural network model to restore the lost voice signal frame;
   wherein the plurality of audio data frames further includes a non-voice signal frame.

2. The audio data packet loss restoration method according to claim 1, wherein the step s103 comprises:
   step s1031: sliding an observation window sequentially on the plurality of voice signal frames to group the plurality of voice signal frames, wherein each group of voice signal frames includes N voice signal frames;
   step s1032: determining whether there is a frame loss situation for voice signal frames within the observation window;
   step s1033: when there is the frame loss situation for the voice signal frames within the observation window, determining the position of the lost voice signal frame within the observation window, to obtain the position information of the lost frame;
   step s107: restoring the lost voice signal frame within the observation window;
   the audio data packet loss restoration method further comprises:
   after the step s107,
   updating, by the processor, the restored voice signal frame to a position corresponding to the lost frame within the observation window.

3. The audio data packet loss restoration method according to claim 2, wherein in the step s1031, the observation window is slid through a sliding mode of an iterative replacement, so that first K voice signal frames within the observation window are slid out of the observation window, and latter K voice signal frames outside the observation window are slid into the observation window, wherein N is an integer greater than or equal to 5;
   wherein the K is equal to 1.

4. The audio data packet loss restoration method according to claim 2, wherein the step s1033 comprises: determining that the position of the lost voice signal frame within the observation window does not correspond to the last frame within the observation window and serves as the first preset position;
   the step s105 comprises: inputting the voice signal frames within the observation window into the first restoration model to restore the lost voice signal frame, wherein data inputted into the first restoration model comprises the last frame within the observation window.

5. The audio data packet loss restoration method according to claim 2, wherein the step s1033 comprises: determining that there are at least two voice signal frames lost, positions of the lost frames comprise the position of the last frame within the observation window and another position within the observation window, wherein the other position serves as a second preset position;
   the step s105 comprises: inputting a voice signal frame before the other position in the observation window into the second restoration model to restore the voice signal frame at the other position, wherein data inputted into the second restoration model comprises the voice signal frame before the other position within the observation window and excludes the last frame within the observation window.

6. The audio data packet loss restoration method according to claim 1, further comprising:
   after the step s102,
   performing, by the processor, a desalination envelope processing on an audio signal of the non-voice signal frame.

7. The audio data packet loss restoration method according to claim 1, wherein the audio device is a headset, a mobile terminal or a smart wearable device having an audio playback function.

8. An audio signal interaction system, comprising: a first device and a second device,
   wherein the first device is configured to transmit an audio data packet to the second device, the second device is configured to implement the method according to claim 1.

9. The audio signal interaction system according to claim 8, wherein the first device is a mobile terminal, and the second device is a headset.

10. A non-transitory computer-readable storage medium, on which a computer program is stored, wherein the computer program, when executed by a processor, causes the processor to implement the method according to claim 1.

11. A chip for an audio device having an integrated circuit thereon, wherein the integrated circuit is designed to implement the method according to claim 1.

12. A neural network-based audio data packet loss restoration apparatus, comprising: a processor and a memory for storing program instructions executed by the processor;

wherein the processor is configured to:
acquire an audio data packet, wherein the audio data packet comprises a plurality of audio data frames, and the plurality of audio data frames comprises at least a plurality of voice signal frames, and a voice signal frame is an audio data frame comprising a voice signal;
when there is a frame loss situation that a voice signal frame in the plurality of audio data frames is lost, determine a position of a lost voice signal frame in the plurality of audio data frames to obtain position information of the lost frame, wherein the position comprises a first preset position or a second preset position;
select a neural network model for a restoration of the frame loss situation according to the position information of the lost frame, wherein the neural network model comprises a first restoration model and a second restoration model, the first restoration model is configured to a voice signal frame at the first preset position, and the second restoration model is configured to restore a voice signal frame at the second preset position;
input the plurality of audio data frames into the selected neural network model to restore the lost voice signal frame;
wherein the plurality of audio data frames further comprises a non-voice signal frame, the processor is further configured to be capable of executing the stored program instructions to:
distinguish the voice signal frame from the non-voice signal frame in the plurality of audio data frames according to a preset algorithm;
wherein the position information of the lost frame is a position of the lost voice signal frame in a group of voice signal frames, and the group of voice signal frames comprises N voice signal frames, wherein N is an integer greater than or equal to five.

13. The audio data packet loss restoration apparatus according to claim 12, wherein the processor is further configured to be capable of executing the stored program instructions to:
sequentially slide an observation window on the plurality of voice signal frames to group the plurality of voice signal frames into groups each of which comprises N frames;
determine whether there is a frame loss situation for the voice signal frames within the observation window; and
when there is the frame loss situation for the voice signal frames within the observation window, determine the position of the lost voice signal frame in the observation window to obtain the position information of the lost frame;
restore the lost voice signal frame within the observation window;
update the restored voice signal frame to the position corresponding to the lost frame in the observation window.

14. The audio data packet loss restoration apparatus according to claim 13, wherein the processor is further configured to be capable of executing the stored program instructions to slide the observation window in a sliding mode of an iterative replacement, so that first K voice signal frames within the observation window are slid out of the observation window, and latter K voice signal frames outside the observation window are slid into the observation window, wherein N is an integer greater than or equal to 5;
wherein the K is equal to 1.

15. The audio data packet loss restoration apparatus according to claim 1, wherein the processor is further configured to be capable of executing the stored program instructions to: determine that the position of the lost voice signal frame in the observation window does not correspond to the last frame within the observation window and serves as the first preset position;
input the voice signal frames within the observation window into the first restoration model to restore the lost voice signal frame, wherein data inputted into the first restoration model comprises the last frame within the observation window.

16. The audio data packet loss restoration apparatus according to claim 13, wherein the processor is further configured to be capable of executing the stored program instructions to: determine that there are at least two voice signal frames lost, positions of the lost frames comprise a position of the last frame within the observation window and another position within the observation window, wherein the other position serves as the second preset position;
input a voice signal frame before the other position in the observation window into the second restoration model to restore the voice signal frame at the other position, wherein data inputted into the second restoration model comprises the voice signal frame before the other position within the observation window and excludes the last frame within the observation window.

17. The audio data packet loss restoration apparatus according to claim 12, the processor is further configured to be capable of executing the stored program instructions to:
perform a desalination envelope processing on an audio signal of the non-voice signal frame.

* * * * *